United States Patent
Vanderburgh

(10) Patent No.: US 9,534,919 B2
(45) Date of Patent: Jan. 3, 2017

(54) METHOD AND APPARATUS FOR PRESENTING A TRAVEL METRIC

(71) Applicant: Honda Motor Co., Ltd., Minato-ku, Tokyo (JP)

(72) Inventor: David Vanderburgh, Dublin, OH (US)

(73) Assignee: HONDA MOTOR CO., LTD., Tokyo (JP)

(*) Notice: Subject to any disclaimer, the term of this patent is extended or adjusted under 35 U.S.C. 154(b) by 0 days.

(21) Appl. No.: 14/325,710

(22) Filed: Jul. 8, 2014

(65) Prior Publication Data

US 2016/0011000 A1 Jan. 14, 2016

(51) Int. Cl.
*G01C 21/12* (2006.01)
*G01C 21/34* (2006.01)
*G01C 21/36* (2006.01)

(52) U.S. Cl.
CPC ....... *G01C 21/3682* (2013.01); *G01C 21/3676* (2013.01)

(58) Field of Classification Search
CPC .. G06F 17/30598; G06F 13/102; G06F 17/27; G06F 12/12; G06F 1/163; G01C 21/3629; G01C 21/3697; G01C 21/3667; G01C 21/34; G01C 21/26; G01C 21/3647; G01C 21/20; G01C 21/3673; G01C 21/3453
USPC ........... 701/431, 22, 36, 527, 409, 465, 400, 428,701/410, 117, 425, 532, 537
See application file for complete search history.

(56) References Cited

U.S. PATENT DOCUMENTS

| | | | |
|---|---|---|---|
| 6,600,994 B1 | 7/2003 | Polidi | |
| 6,941,222 B2 | 9/2005 | Yano et al. | |
| 7,130,743 B2 | 10/2006 | Kudo et al. | |
| 7,233,861 B2 | 6/2007 | Van Buer et al. | |
| 7,463,973 B2 | 12/2008 | Okude et al. | |
| 7,536,258 B2 | 5/2009 | Kudo et al. | |
| 7,610,151 B2 | 10/2009 | Letchner et al. | |
| 7,831,384 B2 | 11/2010 | Bill | |
| 7,835,859 B2 | 11/2010 | Bill | |
| 7,869,942 B2 | 1/2011 | Naito et al. | |
| 8,285,481 B2* | 10/2012 | De Silva | G01C 21/3682 340/995.18 |
| 8,468,464 B2* | 6/2013 | Abramson | G01C 21/367 701/409 |
| 8,498,809 B2 | 7/2013 | Bill | |
| 8,532,921 B1 | 9/2013 | Rovik et al. | |
| 8,548,734 B2 | 10/2013 | Barbeau et al. | |
| 8,548,735 B2* | 10/2013 | Forstall | G01C 21/20 340/995.24 |
| 8,612,141 B2 | 12/2013 | Miyahara et al. | |

(Continued)

*Primary Examiner* — Calvin Cheung
*Assistant Examiner* — Luis A Martinez Borrero
(74) *Attorney, Agent, or Firm* — Arent Fox LLP

(57) ABSTRACT

An apparatus includes a navigation device having a display device and a processing device coupled thereto and configured to present on the display device an indicator of a legend location, determine at least one travel metric corresponding to at least one legend location, and present the at least one travel metric in tandem with the indicator of the legend location. The at least one travel metric includes one or more of the following: a travel route distance to the legend location from a current physical location, an estimated time of arrival at the legend location, and an estimated duration of travel to the legend location from the present physical location. A corresponding method is also provided.

14 Claims, 6 Drawing Sheets

(56) References Cited

U.S. PATENT DOCUMENTS

| | | | |
|---|---|---|---|
| 8,635,021 B2 | 1/2014 | Heng et al. | |
| 8,645,061 B2 | 2/2014 | Newson et al. | |
| 8,855,919 B2* | 10/2014 | Tang | G01C 21/3476 455/456.3 |
| 8,880,336 B2* | 11/2014 | van Os | G01C 21/3635 345/173 |
| 8,935,046 B2* | 1/2015 | Muhlfelder | G01C 21/3635 701/37 |
| 2006/0025920 A1* | 2/2006 | Nezu | G01C 21/36 701/532 |
| 2007/0005235 A1 | 1/2007 | Suzuki et al. | |
| 2007/0225902 A1* | 9/2007 | Gretton | G01C 21/26 701/533 |
| 2008/0082262 A1* | 4/2008 | Silva | G01C 21/3682 701/431 |
| 2008/0167802 A1* | 7/2008 | Yoshioka | G01C 21/3611 701/533 |
| 2008/0177462 A1* | 7/2008 | Yoshioka | G01C 21/343 701/532 |
| 2008/0262713 A1* | 10/2008 | Tajima | G01C 21/36 701/431 |
| 2011/0144904 A1* | 6/2011 | Pinkus | G01C 21/362 701/533 |
| 2011/0161001 A1 | 6/2011 | Fink | |
| 2011/0295078 A1* | 12/2011 | Reid | G06Q 50/22 600/300 |
| 2012/0143501 A1* | 6/2012 | Tang | G01C 21/3476 701/465 |
| 2012/0191476 A1* | 7/2012 | Reid | G06Q 50/24 705/3 |
| 2012/0306779 A1* | 12/2012 | Weeldreyer | G06F 3/0488 345/173 |
| 2012/0310526 A1 | 12/2012 | Mizuno et al. | |
| 2012/0310530 A1* | 12/2012 | Lee | G01C 21/3697 701/439 |
| 2013/0050131 A1* | 2/2013 | Lee | G08G 1/09626 345/174 |
| 2013/0054134 A1 | 2/2013 | Wang et al. | |
| 2013/0110392 A1* | 5/2013 | Kosseifi | G01C 21/3415 701/410 |
| 2013/0173154 A1* | 7/2013 | Wither | G01C 21/3635 701/532 |
| 2013/0173156 A1* | 7/2013 | Wither | G01C 21/3682 701/533 |
| 2013/0238241 A1* | 9/2013 | Chelotti | G01C 21/3617 701/533 |
| 2013/0325341 A1* | 12/2013 | van Os | G01C 21/3611 701/533 |
| 2014/0012495 A1 | 1/2014 | Ide et al. | |
| 2014/0025296 A1* | 1/2014 | Shimizu | G01C 21/00 701/533 |
| 2014/0172292 A1* | 6/2014 | McGee | G01C 21/3608 701/418 |
| 2014/0180576 A1* | 6/2014 | LaMarca | G01C 21/3484 701/465 |
| 2014/0278072 A1* | 9/2014 | Fino | G01C 21/3697 701/465 |
| 2014/0278086 A1* | 9/2014 | San Filippo | G01C 21/3492 701/527 |
| 2015/0015479 A1* | 1/2015 | Cho | G06F 3/013 345/156 |
| 2015/0062052 A1* | 3/2015 | Bernstein | G06F 3/0416 345/173 |
| 2015/0088411 A1* | 3/2015 | Foster | G01C 21/3626 701/410 |
| 2015/0192427 A1* | 7/2015 | Choi | G01C 21/3647 701/431 |
| 2015/0211878 A1* | 7/2015 | Jiyama | G01C 21/365 701/439 |
| 2016/0169697 A1* | 6/2016 | Vecera | G01C 21/36 701/408 |

* cited by examiner

METHOD AND APPARATUS FOR PRESENTING A TRAVEL METRIC

BACKGROUND

The subject matter disclosed herein relates to methods and corresponding navigation devices and, more particularly, to methods and corresponding apparatus for presenting a travel metric on a display device of a navigation device.

Navigation devices or navigation systems, as are commonly understood in the art, are typically utilized to determine a present physical location of the navigation device (or of a user of the device) and/or a route to a destination. Such devices may be installed within a vehicle (such as an automobile, a boat, an aircraft, or the like), while other permutations include portable electronic devices (such as portable dedicated navigation devices or mobile phones). Navigation devices often include or interface with a display device capable of presenting a graphical representation of a navigation map. If programmed with a destination, navigation devices may also show one or more suggested routes to the destination and possibly include graphical, textual, and/or auditory commands that instruct a user of the navigation device how to traverse the route.

Often, a navigation device will show an estimated time of arrival (ETA) to the route destination or a remaining distance to travel to the route destination. However, though suitable for some purposes, such an approach does not necessarily meet the needs of all application settings and/or users. For example, if a user wants to know an ETA or a distance to a certain location, the user is required to enter and set the location as the route destination.

SUMMARY

According to one aspect, an apparatus includes a navigation device having at least one display device and at least one processing device communicatively coupled to the at least one display device. The at least one processing device is configured to present on the at least one display device an indicator of a legend location and determine at least one travel metric corresponding to at least one legend location. The at least one travel metric includes one or more of the following: a travel route distance to at least one legend location from a current physical location of the navigation device, an estimated time of arrival at the at least one legend location, and an estimated duration of travel to the at least one legend location from the current physical location of the navigation device. The processing device is also configured to present on the at least one display device the at least one travel metric in tandem with the indicator of a legend location.

According to another aspect, a method includes, at an apparatus comprising a navigation device, displaying on at least one display device an indicator of a legend location. At least one travel metric is determined corresponding to at least one legend location. The at least one travel metric includes one or more of the following: a travel route distance to at least one legend location from a current physical location of the navigation device, an estimated time of arrival at the at least one legend location, and an estimated duration of travel to the at least one legend location from the current physical location of the navigation device. The method also includes displaying on the at least one display device the at least one travel metric in tandem with the indicator of a legend location.

According to yet another aspect, a vehicle includes a vehicle navigation device having at least one display device and at least one processing device communicatively coupled to the at least one display device. The at least one processing device is configured to present on the at least one display device an indicator of a legend location and determine at least one travel metric corresponding to at least one legend location. The at least one travel metric includes one or more of the following: a travel route distance to at least one legend location from a current physical location of the vehicle, an estimated time of arrival at the at least one legend location, and an estimated duration of travel to the at least one legend location from the current physical location of the vehicle. The processing device is also configured to present on the at least one display device the at least one travel metric in tandem with the indicator of a legend location.

The embodiments disclosed herein are not intended to limit or define the full capabilities of the device. It is assumed that the drawings and depictions constitute exemplary embodiments of the many embodiments of the device and methods.

DETAILED DESCRIPTION

Figure 1:
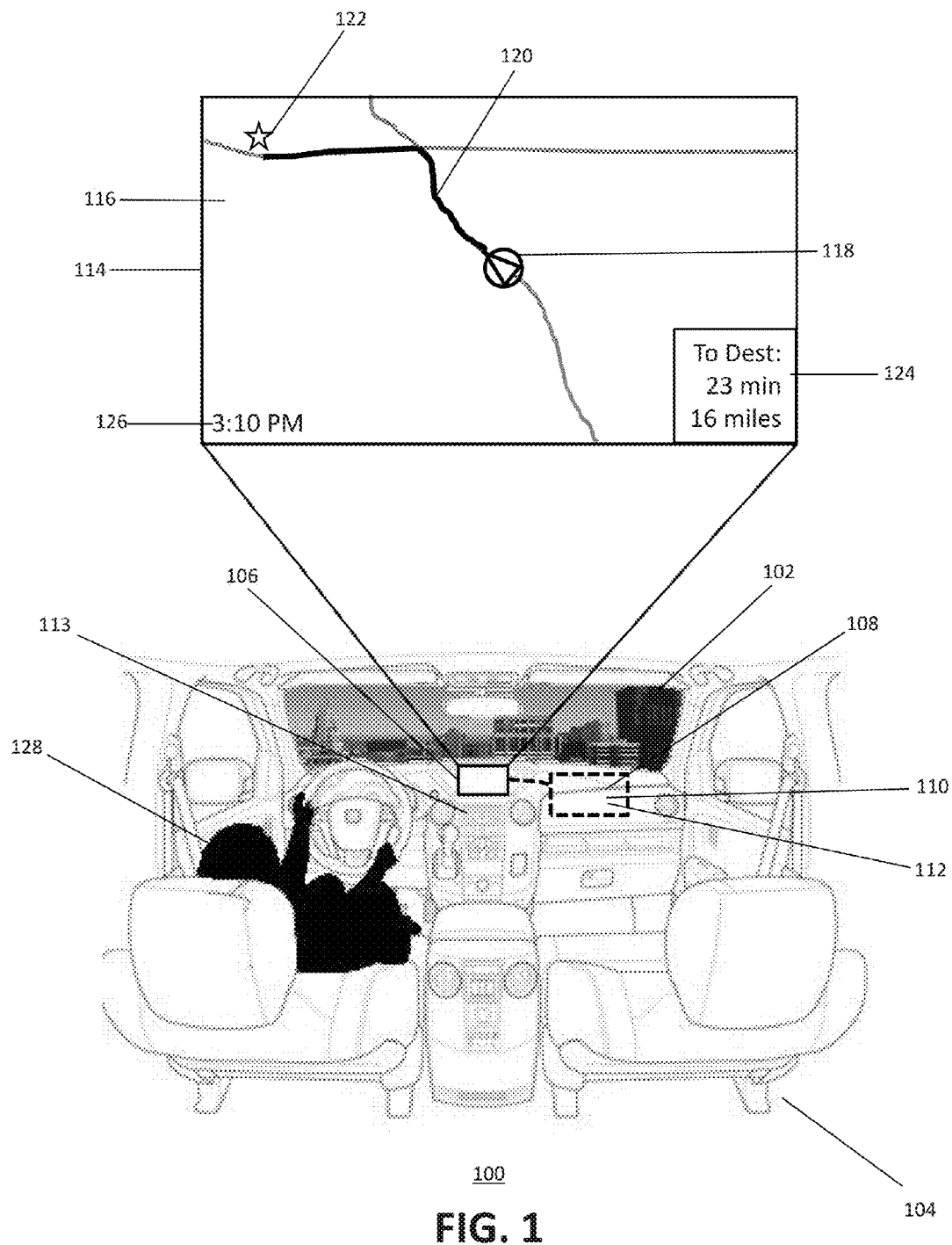
FIG. 1 is an exemplary contextual application of a navigation device in accordance with various embodiments.

Referring now to the figures, FIG. 1 illustrates an exemplary contextual application setting 100 of a navigation device 102 in accordance with various embodiments described herein. An interior of a vehicle 104 is illustrated including the navigation device 102. The navigation device 102 includes or is communicatively coupled to a display device 106, which may be a dedicated display device 106 for exclusive use by the navigation device 102, or may be a shared display device 106 that may be shared in terms of usage time, usage space, or both (for example, an infotainment center display, and/or heads-up display as part of the vehicle 104, or as part of a display screen of a smart phone). The navigation device 106 also includes a navigation module 108. In the example vehicle 104, the navigation module 108 may be co-located with the display device 106, or may be located separately therefore (for example, within the dash, under a seat, in the trunk, in the center counsel, or elsewhere as may be appropriate in a particular application setting. The navigation module 108 includes at least one processing device 110 (or, similarly, the navigation module 108 may be executed on or by at least one processing device 110). It should be understood, however, that portions of the functionality of the navigation module 108 may be implemented in other modules or systems throughout the vehicle 104. The navigation module 108 may also include or be coupled to one or more memory devices 112 to store navigation databases, navigation information, and settings or configurations. The navigation module 108 may include or be communicatively coupled to one or more Global Positioning Satellite (GPS) receivers, a radio-frequency receiver, a cellular receiver, and/or any other device that allows the navigation module 108 to determine a current physical location of the navigation device 102. For example, and as is understood in the art, the navigation device 102 may use standard GPS signals to determine its current physical location, or it can use triangulation of cellular tower signals or communication with local area networks (such as WiFi, for example, according to IEEE standard 802.11) or Wide Area networks (such as WiMax, for example, according to IEEE standard 802.16) to determine its current physical location. A user 128 can interface with the navigation device 102 via various user interfaces 113, including dedicated or soft buttons, actuators, levers, knobs, switches, or via a touch screen interface, vocally via speech recognition, visually via gesture recognition, or via any other input device that allows navigation device 102 to function as described herein.

Although the exemplary contextual application setting 100 illustrated in FIG. 1 is a vehicle navigation device 102 installed into a vehicle 104, the teachings herein can be applied to any navigation device 102. For example, these teachings readily apply to portable or aftermarket navigation devices (including, for example, aftermarket vehicular navigation devices, and handheld navigation devices) as well as other devices that can include a navigation feature (including, for example, smart phones, tablets, and laptops). Accordingly, the contextual setting illustrated in FIG. 1 is but one example of the many applications to which these teachings may apply.

With continued reference to FIG. 1, a screenshot 114 as may be presented on the display device 106 in accordance with various embodiments is enlarged for detail. The at least one processing device 110 is configured to present on the display device 106 a navigation map 116 including a visual representation of a current physical location 118 of the navigation device 102 (corresponding to the current physical location of the vehicle 104 in this example). The navigation map 116 graphically represents various roads and/or other points of interest in a surrounding physical area. As shown in FIG. 1, the navigation map 116 also includes a present route 120 for the navigation device 102 (shown as a bolded portion of the illustrated navigation map 116) and includes a present route destination 122 for the navigation device 102. A present route destination 122 is typically entered by a user 128 and set as such, in response to which the navigation device 102 can determine and display the present route 120 to the present route destination 122. Typically, this process is initiated by a user 128 commanding the navigation device 102 to set the present route 120 and route destination 122. The at least one processing device 110 may also be configured to determine and present on the display device 106 various travel metrics 124 relating to the present route 120 and/or the present route destination 122. For example, the route- or destination-based travel metrics 124 may include an estimated duration of travel to the present route destination 122 according to the present route 120 (e.g., "23 min", meaning it will take an estimated 23 minutes to arrive at the present route destination 122 while traveling on the present route 120). The route- or destination-based travel metrics 124 may include a travel route distance to the present route destination 122 (e.g., "16 miles", meaning the present route 120 is 16 miles to arrive at the present route destination 122). Although not shown, the route- or destination-based travel metrics 124 may also include an estimated time of arrival at the at least one present route destination 122 (e.g., "3:33 PM", meaning arrival at the present route destination 122 is estimated to be at 3:33 PM according to the present route 120). Any combination of one or more of these example route- or destination-based travel metrics 124 may be presented, as well as other examples not described here. Other information may be presented on the display device 106, including, for example a present time 126 as illustrated in FIG. 1, or various other items of information (e.g., a present temperature, a radio station, various status indicators relating to the vehicle 104 or the navigation device 102 itself, and other items of information as may be appropriate in a given application setting).

In prior art navigation devices, a user 128 of a navigation device programs a present route or a present route destination into the navigation device and activates the presentation of the route in order to learn these various route- or destination-based travel metrics. These actions may be required even if the user 128 does not wish to use the route (for example, if he/she already knows how to get to the route destination). Thus, in an instance where the user 128 simply wants to know for informational purposes how far a certain location is, or how long it will take to travel to that certain location, the user 128 will have to take the time to program the present route or the present route destination into the navigation device. This can be frustrating or distracting for a user 128 (which distractions are not desirable while driving). This can be particularly frustrating if the user 128 is not interested in being provided with the route and views this as extraneous information.

Figure 2:
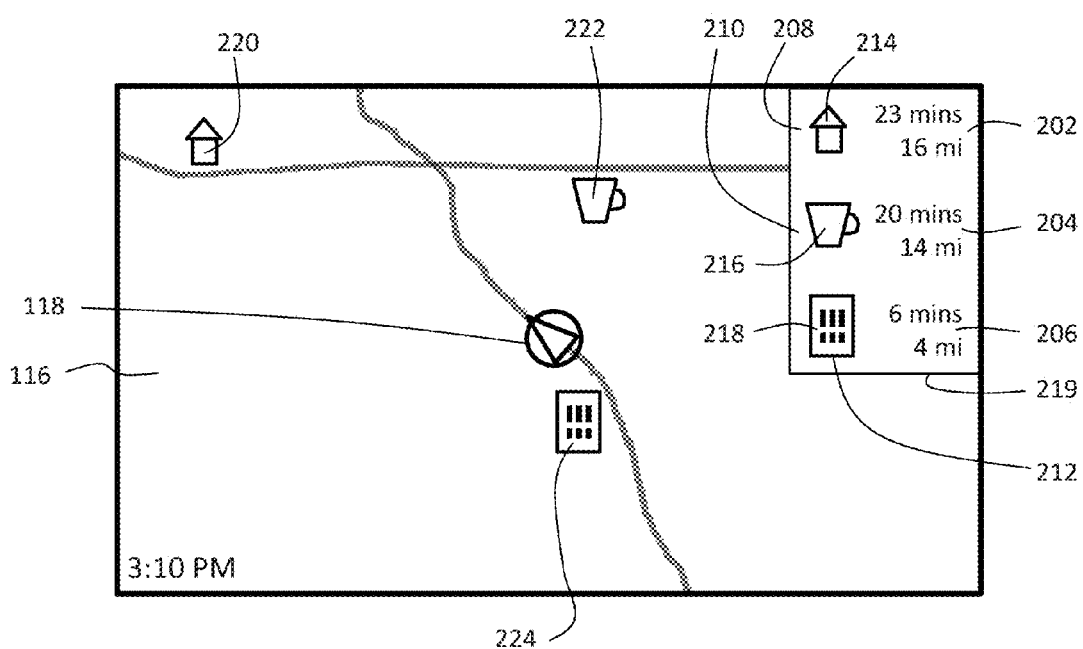
FIGS. 2-5 are exemplary screenshots of images that may be created and displayed by the navigation device shown in FIG. 1.

Turning now to FIG. 2, an exemplary screenshot 200 as may be presented on a display device 106 is shown illustrating various aspects of the navigation device 102 in accordance with various embodiments. As with FIG. 1, the at least one processing device 110 is configured to present on the display device 106 the navigation map 116 along with the visual indication 118 of the current physical location. Other information may be presented as well, including, for example, the present time 126. In this example, neither a present route 120 nor a present route destination 122 is set or activated. However, despite this, the processing device 110 is configured to determine at least one travel metric 202, 204, 206 corresponding to at least one legend location 208, 210, 212. The at least one processing device 110 is in turn configured to present on the at least one display device 106 the at least one travel metric 202, 204, 206 in tandem with the navigation map 116. The travel metrics may be presented as a single (or multiple) travel metric 202 corresponding to a single legend location 208, or as a plurality of travel metrics 202, 204, 206 corresponding to a plurality of legend locations 208, 210, 212 (where certain individual travel metrics correspond to certain individual legend locations).

Legend locations 208, 210, 212 are predefined, preselected, or predetermined locations that are, in various embodiments, automatically displayed or presented in tandem with the navigation map 116 without any action on part of a user 128 to cause the legend locations and their corresponding travel metrics 202, 204, 206 to be displayed when the navigation device 102 is initiated (e.g., turned on or set to show a navigation map 116). For example, in one embodiment, a user may initialize the navigation device 102 (for example, by turning on a vehicle, powering on the navigation device 102, selecting a navigation map 116 to be presented, or other actions) and various legend locations 208, 210, 212 may be shown with the navigation map. As such, legend locations 208, 210, 212 are, in some instances, locations other than a route destination 122 and can be presented whether or not a route destination 122 is programmed or activated. For example, to display the legend locations 208, 210, 212, the user 128 is not required to set a present route destination 122 and is not required to select the various legend locations every time the user 128 initializes the navigation device 102 (e.g., turns on the vehicle 104). The user 128 may be allowed to configure the presentation of these travel metrics in a settings page or state (described below), however, once set or enabled, a user 128 will not be required to return to the settings page every time the navigation device 102 is initialized to enable presentation of the legend locations 208, 210, 212.

In one embodiment, the at least one legend location 208, 210, 212 is a location other than a present route destination 122, whether or not a present route destination 122 is programmed or activated. Thus, as is illustrated in FIG. 2, no present route destination 122 is entered, however, three travel metrics 202, 204, 206 corresponding to three legend locations 208, 210, 212 are presented on the display device 106. Similarly, if a present route 120 or present route destination 122 was entered, at least one travel metric 202, 204, 206 would or could still be presented as described herein. The travel metrics 202, 204, 206 may be presented with an indicator indicating to which legend location they correspond. In one example, the travel metrics may be presented proximate to (e.g., next to or under) a textual name of the destination (e.g., "home", "coffee", or "work"). In another example, and as is illustrated in FIG. 2, one or more icons 214, 216, 218 may be presented instead of or in addition to the textual name. Icons 214, 216, 218 provide a user 128 with a graphical representation of the legend locations 208, 210, 212 that allows a user 128 to quickly ascertain which legend location 208, 210, 212 is referenced. As is illustrated in FIG. 1, a home-shaped icon 214 may represent a legend location "home" 208; a coffee cup-shaped icon 216 may represent a legend location "coffee" 210; and an office building-shaped icon 218 may represent a legend location "work" 212. These legend locations 208, 210, 212 and their corresponding travel metrics 202, 204, 206 may be presented in an ETA pane 219 (for example, giving an appearance of a map legend) or simply overlaid on the navigation map 116 in a defined location 219. The location 219 may be anywhere on the navigation map 116, though in one embodiment it is positioned along one side or edge to avoid interference with other important graphical information depicted on the navigation map 116. The location 219 may be dedicated or may be dynamic dependent upon various factors or requirements of a particular application setting.

In one embodiment, the processing device 110 may be further configured to insert or overlay matching or similar icons 220, 222, 224 into the navigation map 116 corresponding to their physical geographical location. For example, and as is illustrated in FIG. 2, a home-shaped icon 220 may represent the physical location of the legend location "home" 208; a coffee cup-shaped icon 222 may represent the physical location of the legend location "coffee" 210; and an office building-shaped icon 224 may represent the physical location of the legend location "work" 212. Individual ones of the icons 220, 222, 224 may or may not be presented on the navigation map 116 depending on various factors and/or settings. For example, if the navigation map 116 is zoomed in to a point where one of the legend locations (for example, "home" 208) may not appear on the navigation map 116, the icon 220 may not be presented. However, in another example, the icon 208 may still be presented with an indication (e.g., an arrow) indicating that it is off the map but in that general direction. However, whether displayed or not, and dependent upon other settings, the name or icon 224 and the corresponding travel metric(s) 202 corresponding to "home" 208 may still be presented in location 219. Similarly, in some embodiments, an icon (such as icons 220, 222, 224) may appear on the navigation map 116 corresponding to a different legend location, however, dependent upon settings or other factors (discussed below), a travel metric may not be presented for that corresponding legend location. In this instance, the presentation of the icon into the navigation map 116 may serve simply as a graphical representation of the physical location of the legend location, while, for one reason or another, associated travel metrics are not required or desired. Additionally still, in certain embodiments, neither a travel metric nor a navigation map icon will be presented for some legend locations.

As discussed with regard to the present route- or present destination-based travel metrics 124 in FIG. 1, similar travel metrics 202, 204, 206 may be determined or calculated for each of the legend locations 208, 210, 212 (being locations other than a present route destination 122). In one embodiment, the at least one travel metric 202, 204, 206 for the at least one legend location 208, 210, 212 may include a travel route distance to the legend location 208, 210, 212 from the current physical location 118 of the navigation device 102 (for example, "16 miles" as is shown for travel metric 202). The at least one travel metric 202, 204, 206 for the at least one legend location 208, 210, 212 may also include an estimated time of arrival at the legend location 208, 210, 212 (for example, "3:33 PM" as is shown as travel metric 202 in FIG. 3). The at least one travel metric 202, 204, 206 for the at least one legend location 208, 210, 212 may also include an estimated duration of travel to the legend location 208, 210, 212 from the current physical location 118 of the navigation device 102 (for example, "23 mins" as is shown for travel metric 202 in FIG. 2). Other travel metrics may be appropriate in various application settings, and the travel metrics 202, 204, 206 may be presented with one or any combination of two or more of the above described travel metrics and may be individualized for various legend locations 208, 210, 212.

The calculation of the travel metrics may be performed by the processing device 110 of the navigation device 102 as part of its determination of the travel metrics, or, in certain embodiments, may be computed at a remote location (e.g., cloud computing or at a server) and then communicated back to the processing device 110 via known communication methods for further determinations to be made by the processing device 102. The travel metrics 202, 204, 206 may be determined based on a hypothetical route that the navigation device 102 would assign to the legend location 208, 210, 212 if that legend location were set as a present route destination 122. The hypothetical route can be subject to specific requirements (e.g., fastest route, shortest distance, mostly highways, and/or avoid tolls) much like a present route 120 would use. The set of requirements for hypothetical route creation may be individualized for each legend location, may be separated for the set of legend locations, or may be the same default route settings utilized in creation of actual navigation routes 120. The processing device 110 can adjust such a hypothetical route (once upon creation or periodically or in real-time during travel) to account for traffic conditions, weather, time, present location, direction traveling, or other factors. Further, the hypothetical routes may be periodically or continuously updated, for example, as the navigation device 102 moves. This affects the travel metrics 202, 204, 206, the presentation of which on the display device 106 may in turn be updated periodically or continuously.

With continued reference to FIG. 2, in certain embodiments, a plurality of legend locations 208, 210, 212 and their corresponding travel metrics 202, 204, 206 may be assigned a priority, and the presentation thereof on the display device 106 may be in accordance with the assigned priority. For example, a legend location ("home" 208 in this example) can be assigned a higher priority than other legend locations and therefore may appear at the top of a list of legend locations in the list 219 (or may be bolded and/or highlighted, for example) while lower priority legend locations can be lower on the list 219 (or grayed out, for example). The assignment of priority may be dictated by a user 128 (such as in user-set configuration settings) or may be determined by the navigation device 102. The assignment of priority may be made stagnant (for example, by always keeping "home" 208 on top of the list), dynamic dependent upon various settings and current characteristics, or a combination thereof.

In one aspect, the priority assignment may be dependent upon the value of the plurality of travel metrics 202, 204, 206. For example, the closest (distance or travel time) legend location may appear first, with the second closest thereafter, and so forth. In another aspect, the priority assignment may be dependent upon a present location 118 of the navigation device 102. For example, the navigation device 102 may place a geo-fence of one mile, for example, around its present location wherein the navigation device 102 will not provide travel metrics for any legend location within that geo-fence or will place a lower priority on those legend locations. In this example, a user 128 may be aware of his/her close proximity to those legend destinations and may not require travel metrics for them. Further, the fact that a legend location is within the geo-fence may indicate that a user 128 just departed from that legend location (e.g., leaving work to go home) and therefore does not need to know how far he/she is from that location. Additionally, if the navigation device 102 knows that its present location is or recently was a legend location, then the navigation device 102 may assign that legend location a lower priority or omit presentation thereof.

In another aspect, the priority assignment may be dependent upon a present time. For example, the navigation device 102 may have learned (through pattern recognition or other programmed methods) that a user 128 typically heads to work some time between 6:00 AM and 9:00 AM. Therefore, the most useful legend location may be "work" 212 during those times and a higher priority may be assigned thereto. In another aspect, the priority assignment may be dependent upon a present travel direction. For example, as is shown in FIG. 2, if a navigation device 102 (e.g., the vehicle 104) is traveling in a direction away from a legend location ("work" 212 in this example), then that legend location may be assigned a lower priority while other legend locations that the navigation device 102 is headed toward ("home" 208 and "coffee" 210 in this example) may be assigned a higher priority.

In another aspect, the priority assignment may be dependent upon a present route destination 122, if such a present route destination 122 is set. For example, if a legend location (for example, "home" 208) is set as the present route destination 122, then travel metrics corresponding to that legend location (e.g., travel metrics 202 in this example) may not be presented in the travel metric pane 219, though they may be presented in the route-based travel metrics portion 124 (see FIG. 1). In another example, legend locations that are close in proximity to the present route destination 122 or along or near the present route 120 may be assigned a higher priority than legend locations that are not.

In another aspect, the priority assignment may be dependent upon a closest distance and/or a shortest estimated duration of travel. For example, a closer legend location may be assigned a higher priority than a further legend location. In another aspect, the priority assignment may be dependent upon a historical record of previous travel. For example, the navigation device may remember how many times it has been to a certain legend location and may assign it a higher priority if it has been to that location more than other legend locations. In another example, the navigation device 102 may learn that most days the user 128 stops by the coffee shop ("coffee" 210) on the way to work ("work" 212). The navigation device 102 may then include the detour to the legend location "coffee" 210 in its calculation of travel metrics corresponding to the legend location "work" 212. Additionally, by another example, the navigation device 102 may learn a typical route that is traversed to get to a legend location and may use that route in determination of the travel metrics corresponding to that legend location (as opposed to a different travel route that the navigation device 102 may otherwise create or suggest). In another aspect, the priority assignment may be dependent upon user-set configuration settings. For example, as stated above, a user 128 can dictate which legend locations are to be granted a high priority (e.g., the user may dictate which legend locations are "always-on", such as, for example, "home" 208) or may dictate which criteria is most important in assigning priority.

Figure 3:
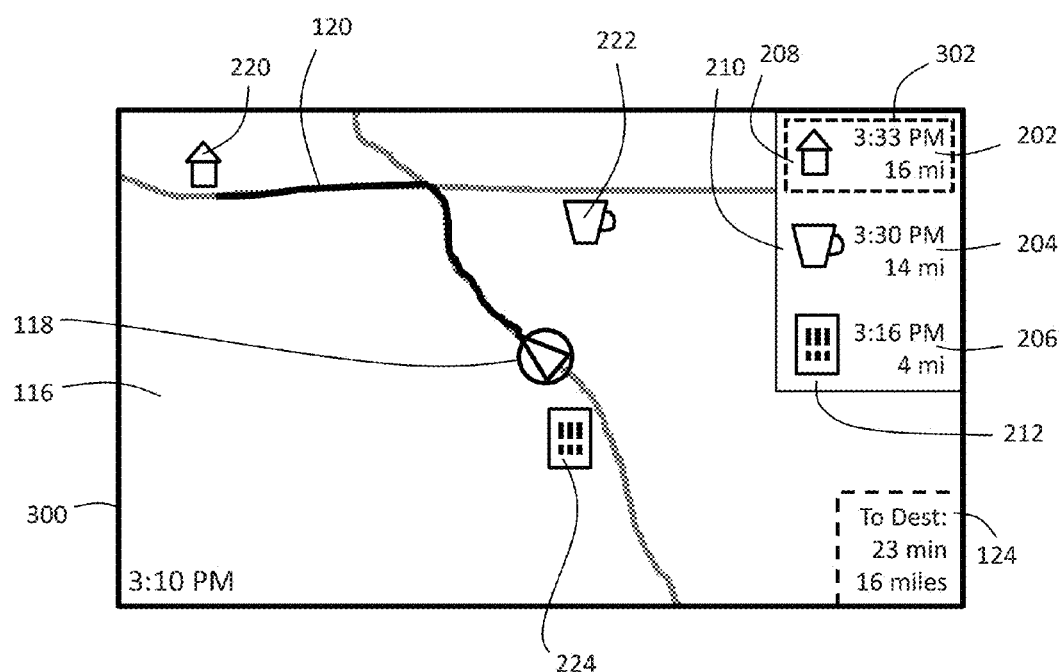

Turning now to FIG. 3, an additional screenshot 300 is shown illustrating various other aspects of the navigation device 102 in accordance with various embodiments. Like FIG. 2, the screenshot 300 includes the navigation map 116 with the visual representation of the current physical location 118, as well as at least one travel metric 202, 204, 206 corresponding to at least one legend location 208, 210, 212. It should be noted that in FIG. 3, a travel metric of the estimated time of arrival at the legend location is provided for each legend location (as opposed to the estimated duration of travel as shown in FIG. 2). The processing device 110 may be configured to enable a quick selection by a user 128 of a legend location corresponding to a travel metric presented on the display device 106 as the present route destination 122 for the navigation device 102. For example, as is illustrated in FIG. 3, a quick selection selector 302 is provided to indicate that the legend location "home" 208 is selected as the present route destination 122. The quick selection selector 302 may be a graphical representation of a selection of the legend location 208, such as a box around the selected legend location 208 (as shown) or highlighting or enlarging the selected legend location 208. Other methods of providing the quick selection selector 302 are contemplated and may include auditory confirmation. In one embodiment, a present route 120 corresponding to the selected legend location may be displayed on the navigation map 116 (as a bolded path or the like). Similarly, the travel metrics 124 relating to the present route 120 or present route destination 122 may be provided in a fashion similar to that illustrated in FIG. 1. The user 128 may be able to make this quick selection via the navigation device user interface 113 as discussed above. In one embodiment, the user 128 may scroll through or highlight various legend locations 208, 210, 212, which in turn may highlight or present a hypothetical route on the navigation map 116 before final selection of the legend location 208 as the present route destination 122 is complete.

Figure 4:
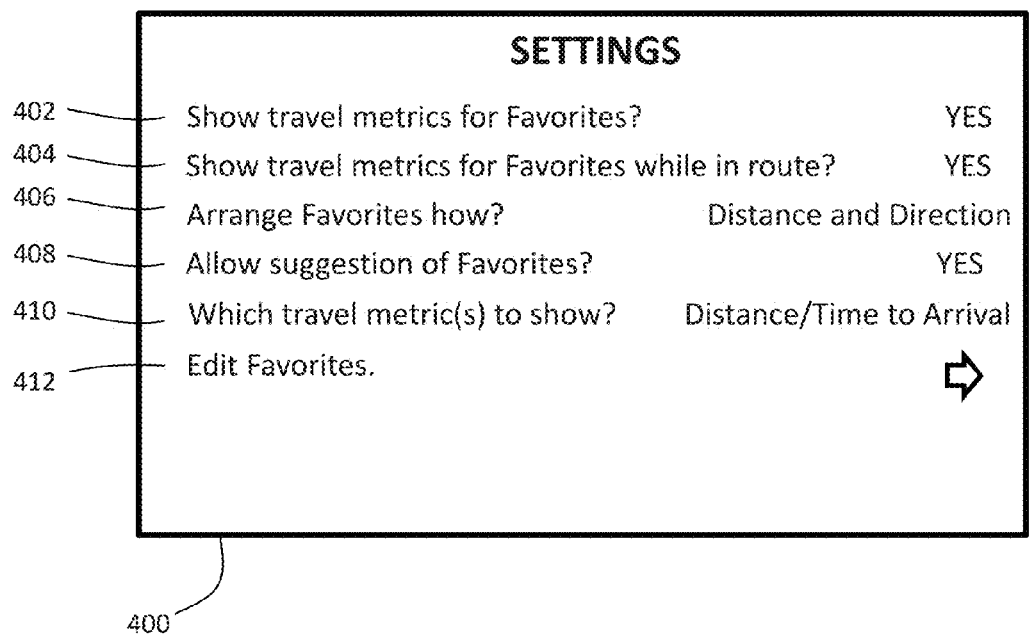

Turning now to FIG. 4, an exemplary screenshot 400 of a settings screen of the navigation device 102 relating to presentation of travel metrics 102, 104, 106 is shown in accordance with various embodiments. The processing device 110 may present various setting options on the display device 106 and enable the user 128 to specify or configure these settings. The processing device 106 may enable the user 128 to specify at least one characteristic of the presentation of the at least one travel metric 202, 204, 206 on the display device 106 in tandem with the navigation map 116. For example, in one embodiment at 402 the user 128 is enabled to specify whether to enable display of any travel metrics 202, 204, 206 for any legend location 208, 210, 212 (e.g., "Favorites"). At 404, the user 128 is enabled to specify whether to show any travel metrics 202, 204, 206 when a present route 120 is entered. At 406, the user 128 is enabled to specify how to arrange display of the legend locations 208, 210, 212 (the display of which is typically according to an assigned priority). Various priority schemes as are discussed above may be individually selectable or selectable in combinations. At 408, the user 128 is enabled to specify whether the navigation device 102 is allowed to suggest adding locations to the list of legend locations (e.g., "Favorites"). For example, the navigation device 102 may recognize that the vehicle 104 commonly stops at a grocery store which is not set as one of the legend locations. In response, the navigation device 102 may present a pop-up message or other indication that suggests or enables entry of the grocery store as a legend location (e.g., entry into the list of "favorites"). At 410, the user 128 is enabled to specify which travel metrics 202, 204, 206 to show (for example, distance, travel time, and/or time of arrival). At 412, the user 128 is enabled to edit a list of legend locations.

Figure 5:
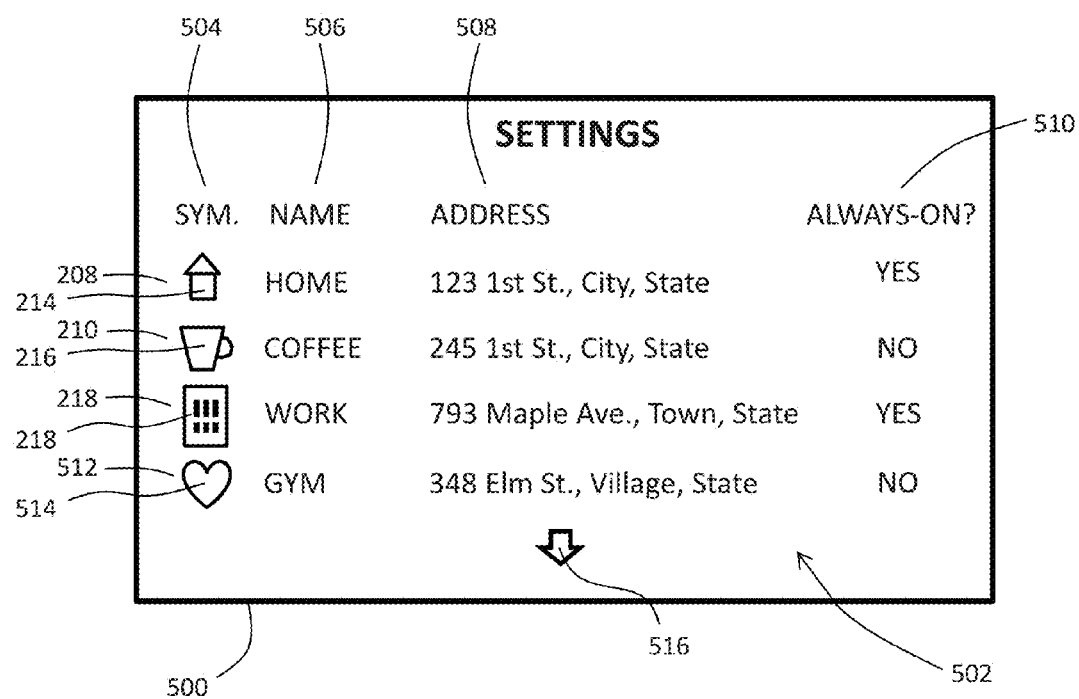

In various embodiments, to allow a user 128 to edit a list of legend locations ("favorites") 502, a screen such as screenshot 500 of FIG. 5 is presented to the user 128. As is illustrated, the processing device 110 is configured to enable specification by the user 128 of at least one legend location. In one embodiment, the list of legend locations 502 includes an editable symbol designator 504, an editable name designator 506, an editable address designator 508, and/or an always-on designator 510 for each legend location. Other fields or designators may be appropriate in varying application settings. In certain embodiments, the user 128 selects an icon for all or some of the legend locations. For example, a home-shaped icon 214 may be selected to represent the legend location "home" 208; a coffee cup-shaped icon 216 may be selected to represent the legend location "coffee" 210; an office building-shaped icon 218 may be selected to represent the legend location "work" 212; a heart-shaped icon 514 may be selected to represent the legend location "gym" 512, and so forth. The name 506 may be auto-filled from a navigation database, or may be entered and/or edited by the user 128. The address 508 may be entered (e.g., typed), or may be selected graphically on the navigation map 116. In certain examples, legend locations are selectable from an address book (for example, from a linked mobile device, tablet, or computer), from a current location or destination, and/or from a list of previous destinations. In one embodiment, the order of the list of legend locations 502 dictates a priority assigned to the various legend locations of the list 502 or an order in which the legend locations appear on the navigation map 116. The user 128 may be able to delete or reorder individual entries in the list of legend locations 502. The user 128 may also be able to scroll 516 through multiple pages of legend locations, if needed or desired.

In one embodiment, an "always-on" designator 510 may be enabled or disabled. If enabled, travel metrics for the legend location (such as "home" 208 and "work" 218 in this screenshot 500) will always be shown in tandem with the navigation map 116. If disabled, then the travel metrics for those legend locations may or may not be presented dependent on various other settings, priorities, or present conditions. The navigation device 102 may limit the number of designated always-on legend locations as space may be limited on the display screen 106 or processing power limited by the processing device 110. The processing device 110 may use the always-on designator 510 to determine at least one always-on legend location from a plurality of legend locations. By this, it may occur that at a first time, both a legend location with always-on enabled and a legend location with always-on disabled may be presented on the display screen 106, while at a second time, the legend location with always-on enabled will be presented while the legend location with always-on disabled may not be presented.

Figure 6:
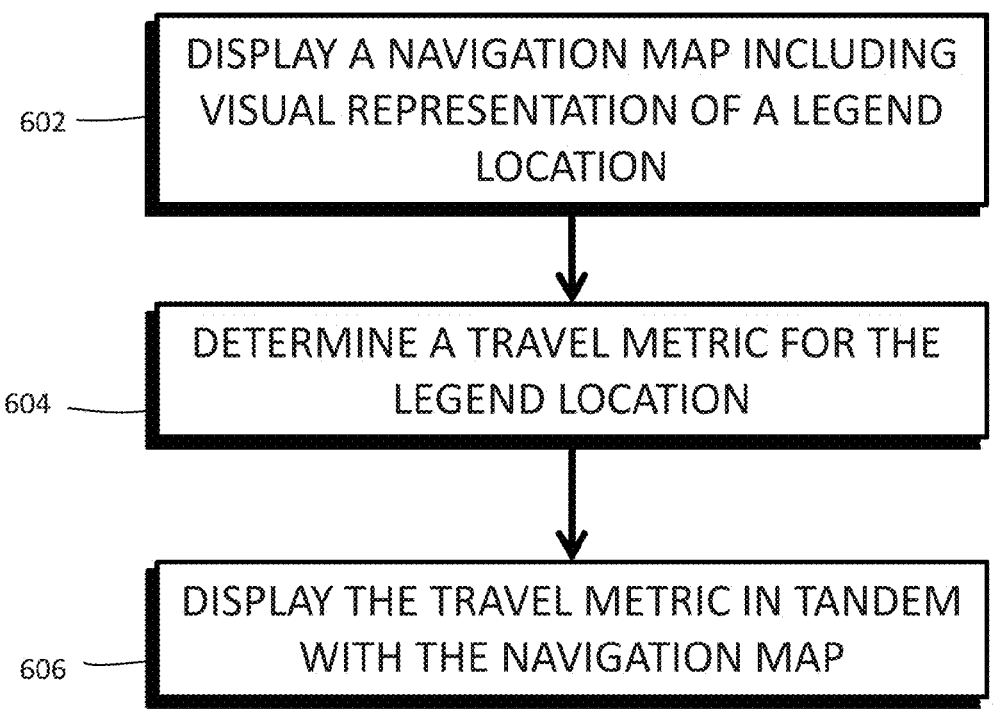
FIG. 6 is a flow diagram of an exemplary method of displaying a travel metric.

Turning now to FIG. 6, an exemplary method 600 is illustrated in accordance with various embodiments. The method may be performed at an apparatus including the navigation device 102 and may be performed by the at least one processing device 110. At step 602, the method includes displaying a navigation map 116 including a visual representation of a current physical location 118. The navigation map 116 may be displayed on the display device 106. The method continues in step 604 by determining at least one travel metric 202, 204, 206 corresponding to at least one legend location 208, 210, 212 that is a location other than a present route destination 122 for the navigation device 102. The at least one travel metric 202, 204, 206 may include any of the travel metrics discussed above. At step 606, the method includes displaying the at least one travel metric 202, 204, 206 in tandem with the navigation map 116, which may also be presented on the display device 106.

So configured, a method and corresponding apparatus have been described such that travel metrics may be presented for certain legend locations without the need for a user to set that location as a present route destination. This convenient feature increases the usability of a navigation device and can provide information much quicker to the user with little to no effort on part of the user.

The word "exemplary" is used herein to mean serving as an example, instance, or illustration. Any aspect or embodiment described herein as "exemplary" is not necessarily to be construed as preferred or advantageous over other aspects or embodiments.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

The foregoing description of embodiments and examples has been presented for purposes of illustration and description. It is not intended to be exhaustive or limiting to the forms described. Numerous modifications are possible in light of the above teachings. Some of those modifications have been discussed and others will be understood by those skilled in the art. The embodiments were chosen and described for illustration of various embodiments. The scope is, of course, not limited to the examples or embodiments set forth herein, but can be employed in any number of applications and equivalent devices by those of ordinary skill in the art. Rather, it is hereby intended the scope be defined by the claims appended hereto. Additionally, the features of various implementing embodiments may be combined to form further embodiments of the disclosure.

What is claimed is:

1. A navigation device, comprising:
    at least one display device; and
    at least one processing device communicatively coupled to the at least one display device, the at least one processing device configured to:
        present on the at least one display device at least one indicator of a legend location, wherein the legend location is one of a plurality of predefined locations other than a present route destination that is programmed by a user on the at least one display device;
        determine at least one travel metric corresponding to the at least one legend location, the at least one travel metric comprising one or more of the following:
            a travel route distance to the at least one legend location from a current physical location of the navigation device;
            an estimated time of arrival at the at least one legend location; and
            an estimated duration of travel to the at least one legend location from the current physical location of the navigation device;
        assign a priority to each of the plurality of predefined locations according to at least one selected criterion; and
        automatically present on the at least one display device the at least one travel metric in tandem with the at least one indicator of the legend location.

2. The navigation by device of claim 1, further comprising a memory device coupled to the at least one processing device and configured to store a plurality of legend locations.

3. The apparatus of claim 1, wherein the at least one processing device is further configured to:
    determine a plurality of travel metrics corresponding to a plurality of legend locations, wherein individual ones of the plurality of travel metrics correspond to individual ones of the plurality of legend locations; and
    automatically present on the at least one display device the plurality of travel metrics in tandem with the navigation map.

4. The apparatus of claim 1, wherein the at least one selected criterion comprises at least one of:
    the plurality of travel metrics;
    a present time;
    a present location;
    a present travel direction;
    the present route destination;
    a closest distance;
    a shortest estimated duration of travel;
    a historical record of previous travel;
    a user-set configuration setting; and
    wherein the at least one processing device is further configured to present on the at least one display device in tandem with the navigation map the plurality of travel metrics in accordance with the priority of the plurality of legend locations.

5. The apparatus of claim 1, wherein the at least one processing device is further configure to enable a selection of the at least one legend location corresponding to the at least one travel metric presented on the at least one display device by a user as the present route destination for the navigation device.

6. The apparatus of claim 1, wherein the at least one processing device is further configured to enable specification of the at least one legend location by a user of the navigation device.

7. The apparatus of claim 1, wherein the at least one processing device is further configured to enable specification of at least one characteristic of the presentation of the at least one travel metric in tandem with the navigation map.

8. The apparatus of claim 1, wherein the apparatus comprises a vehicle and wherein the navigation device comprises a navigation device installed in the vehicle.

9. The apparatus of claim 1, wherein the at least one processing device is configured to present on the at least one display device the at least one travel metric in tandem with the navigation map without further action on part of a user.

10. The apparatus of claim 1, wherein the at least one processing device is configured to present on the at least one display device the at least one travel metric in tandem with the navigation map, wherein the at least one travel metric corresponds to at least one legend location of a plurality of legend locations but not all of the plurality of legend locations.

11. A vehicle, comprising:
    a vehicle navigation device comprising:
        at least one display device; and
        at least one processing device communicatively coupled to the at least one display device, the at least one processing device configure to:
            present on the at least one display device at least a first indicator of a first legend location and a second indicator of a second legend location, wherein each of the first and second legend locations is one of a plurality of predefined locations other than a present route destination that is programmed by a user on the at least one display device;
            determine at least one travel metric corresponding to the first indicator and at least one travel metric corresponding to the second indicator, the at least one travel metric comprising one or more of the following:
                a travel route distance to the at least one legend location from a current physical location of the vehicle,
                an estimated time of arrival at the first and second legend locations, and
                an estimated duration of travel to the first and second legend locations from the current physical location of the vehicle;

assign a priority to each of the first and second legend locations according to at least one selected criterion; and present on the at least one display device the at least one travel metric in tandem with the first indicator of the first legend location and the second indicator of the second legend location.

12. The vehicle of claim 11, wherein the at least one processing device is further configured to:

determine a plurality of travel metrics corresponding to a plurality of legend locations, wherein individual ones of the plurality of travel metrics corresponds to individual ones of the plurality of legend locations; and present on the at least one display device the plurality of travel metrics in tandem with the navigation map.

13. The vehicle of claim 12, wherein the at least one processing device is configured to:

determine at least one always-on legend location from the plurality of legend locations;

at both a first time and a second time, present on the at least one display device at least one travel metric corresponding to the at least one always-on legend location in tandem with the navigation map;

at the first time, present on the at least one display device at least one travel metric corresponding to the at least one other legend location in tandem with the navigation map; and at the second time, omit presentation on the display device of the at least one travel metric corresponding to the at least one other legend location.

14. The vehicle of claim 11, wherein the at least one processing device is configured to enable a selection of the first legend location or the second legend location corresponding to the at least one travel metric presented on the at least one display device by a user as the present route destination for the vehicle.

* * * * *